United States Patent [19]

Womack

[11] Patent Number: 4,659,993
[45] Date of Patent: Apr. 21, 1987

[54] APPARATUS INCLUDING AN EQUIPOTENTIAL HOUSING AND PLURALITY OF FOCUSED CURRENT ELECTRODES FOR ELECTRICALLY LOGGING A WELL FORMATION AT MORE THAN ONE LATERAL DISTANCE FROM A BOREHOLE

[75] Inventor: Terry D. Womack, Duncan, Okla.

[73] Assignee: Halliburton Company, Duncan, Okla.

[21] Appl. No.: 690,353

[22] Filed: Jan. 10, 1985

[51] Int. Cl.$^4$ .............................................. G01V 3/24
[52] U.S. Cl. ...................................... 324/375; 324/371
[58] Field of Search ........ 324/366, 369, 371, 373–375, 324/347

[56] References Cited

U.S. PATENT DOCUMENTS

| | | |
|---|---|---|
| 2,236,668 | 4/1941 | Blau et al. . |
| 2,573,133 | 10/1951 | Greer . |
| 2,654,064 | 9/1953 | Broding ................ 324/366 |
| 2,712,630 | 7/1955 | Doll ..................... 324/373 |
| 2,803,796 | 8/1957 | Schuster ............... 324/373 |
| 2,899,633 | 8/1959 | Smith et al. . |
| 3,079,550 | 2/1963 | Huddleston, Jr. et al. . |
| 3,262,050 | 7/1966 | Threadgold et al. ............ 324/375 |
| 3,293,542 | 12/1966 | Piety ................... 324/369 |
| 3,373,349 | 3/1968 | Tanguy . |
| 3,462,679 | 8/1969 | Attali .................. 324/375 |
| 3,488,574 | 1/1970 | Tanguy ................ 324/373 |
| 3,521,154 | 7/1970 | Maricelli .............. 324/374 |
| 3,760,260 | 9/1973 | Schuster . |
| 3,798,533 | 3/1974 | Schuster . |
| 3,798,534 | 3/1974 | Schuster . |
| 3,798,535 | 3/1974 | Schuster . |
| 3,882,376 | 5/1975 | Schuster . |
| 4,122,387 | 10/1978 | Ajam et al. . |
| 4,335,353 | 6/1982 | Lacour-Gayet . |
| 4,471,307 | 9/1984 | Bravenec . |
| 4,484,139 | 11/1984 | Bravenec ............. 324/366 |
| 4,524,325 | 6/1985 | Moore et al. ........ 324/375 |
| 4,594,552 | 6/1986 | Grimaldi et al. .... 324/374 |

FOREIGN PATENT DOCUMENTS

| | | | |
|---|---|---|---|
| 685727 | 5/1964 | Canada .................... 324/373 |
| 833990 | 5/1960 | United Kingdom ..... 324/373 |

OTHER PUBLICATIONS

Pp. 207–225 of *Petroleum Engineering–Drilling and Well Completions*, Carl Gatlin (1960).

*Primary Examiner*—Gerard R. Strecker
*Attorney, Agent, or Firm*—E. Harrison Gilbert, III; Joseph A. Walkowski

[57] ABSTRACT

An apparatus and a method are disclosed wherein simultaneous electrical well logs can be made with a plurality of focused currents emitted from a plurality of electrodes located along a single equipotential surface of a housing. The focused currents are generated in response to a single voltage signal from a single power supply connected between the housing and a single current return electrode. A voltage reference is located on a cable which suspends the housing and the current return electrode in a well borehole, and a voltage detection circuit detects a voltage offset between the voltage reference and the housing.

1 Claim, 4 Drawing Figures

APPARATUS INCLUDING AN EQUIPOTENTIAL HOUSING AND PLURALITY OF FOCUSED CURRENT ELECTRODES FOR ELECTRICALLY LOGGING A WELL FORMATION AT MORE THAN ONE LATERAL DISTANCE FROM A BOREHOLE

BACKGROUND OF THE INVENTION

This invention relates generally to apparatus and methods for obtaining information used to measure electrical properties of a formation intersected by a well borehole. More particularly, but not by way of limitation, the present invention relates to apparatus and methods for concurrently detecting and measuring a plurality of currents which are focused as they flow from a plurality of electrodes, mounted on a single equipotential housing, in response to a single voltage signal from a single power supply so that electrical characteristics of the formation, such as resistivity, can be concurrently determined at different depths of investigation.

It is known that measurements of formation resistivity made at several lateral distances from a well borehole provide information which can be used in analyzing whether the formation has suitable characteristics for likely producing oil and gas. A deep measurement will give apparent formation resistivity, a shallow measurement will give the invaded zone resistivity, and a very shallow measurement of the formation immediately adjacent the borehole will give flushed zone resistivity.

One technique for measuring the resistivity of a formation is with focused currents. This technique forces a current flow in a relatively limited width laterally or radially outwardly from a suitable focused-current apparatus disposed in a borehole. One specific type of such an apparatus is described in U.S. Pat. No. 4,122,387 in the name of Ajam et al. This apparatus includes a tool having a shallow guard tool connected with, but electrically insulated from, a deep guard tool. This apparatus has two power supplies and two current return electrodes for simultaneously logging two focused currents which are making two different depths of investigation in the surrounding formation. A depth of investigation refers to the lateral outward extent from the borehole into the formation within which a certain percentage of the tool response is developed, as known to the art.

The type of tool disclosed in the Ajam et al. patent has several shortcomings. For example, the tool of the Ajam et al. patent is basically two separate tools mechanically connected, but electrically insulated from, each other. Additionally, the Ajam et al. apparatus has a power system for each guard section of the tool. There is also one current return for each guard section. Such duplicated construction makes it difficult to add more sections for simultaneously logging more than two depths of investigation.

There is the need for an apparatus and method by which multiple depths of investigation can be simultaneously logged without requiring substantial duplication of parts for each additional depth of investigation. It is also desirable for such an apparatus to have a simplified construction wherein a single fully integrated tool, rather than two separate tools simply connected together, is obtained. However, such an integrated tool must be operable and provide suitable focused currents.

SUMMARY OF THE INVENTION

The present invention overcomes the above-noted and other shortcomings of the prior art by providing a novel and improved apparatus and method for logging at least one electrical characteristic of a well formation at more than one lateral distance from a borehole. The present invention utilizes a single, fully integrated electrically conductive housing which provides a single substantially equal potential surface. Only a single power system and a single current return are used regardless of the number of depths of investigation to be logged with the present invention.

Broadly, the present invention provides a well logging apparatus for obtaining information for measuring electrical properties, such as resistivity, of a formation intersected by a borehole. This apparatus comprises an elongated housing having a continuous substantially equal potential along its length. Attached to the housing are a plurality of electrically conductive members. The conductive members are spaced from each other, but are all disposed within the continuous substantially equal potential length of the housing. These members include means for providing focused current paths from which focused currents can leave the housing. The apparatus still further comprises current return means, spaced from the housing, for receiving currents flowing from the conductive members. The apparatus also includes means for enabling the focused currents to flow from the conductive members and means for detecting the focused currents.

In a preferred embodiment, the current return means includes one, and only one, electrode connected in spaced relationship to the housing for simultaneously receiving currents flowing from the plurality of electrically conductive members.

Also in a preferred embodiment, the housing includes at least three electrically conductive cylindrical members and at least two electrically conductive hub members interconnected in electrical short-circuit relationship with each other. Each of the hub members has a respective one of the aforementioned means mounted thereon for providing a focused current path from which a focused current can leave the housing.

In a preferred embodiment, the means for enabling includes power supply means for applying a single selectable voltage between the housing and the current return means, in response to which voltage the currents flowing from the plurality of electrically conductive members are generated.

Further in a preferred embodiment, a cable means is included for lowering the housing into the borehole. The cable means has the current return means connected thereto, and the cable means has an at least partially uninsulated armor sheath for providing a voltage reference locus. Associated with such a preferred embodiment is a means for detecting a voltage difference between the housing and the voltage reference locus.

The method of the present invention includes lowering into a borehole a substantially equal potential member having two focused current electrodes mounted thereon, lowering into the borehole a current return electrode so that the current return electrode is spaced from the equal potential member, applying a voltage between the equal potential member and the current return electrode, measuring a first current flowing from one of the focused current electrodes in response to the voltage, and measuring a second current flowing from another focused current electrode in response to the voltage. In a preferred embodiment, the step of applying a voltage includes generating the voltage from one, and only one, power supply. In a preferred embodiment, the method further comprises performing the steps of measuring a first current and measuring a second current concurrently. A preferred embodiment also further comprises using an outer electrically conductive portion of the cable as a voltage reference, which portion is disposed above the current return electrode when the housing and the current return electrode are lowered into the borehole, and detecting any voltage difference between the electrically conductive portion of the cable and the substantially equal potential member.

Therefore, from the foregoing, it is a general object of the present invention to provide a novel and improved apparatus and method for logging an electrical characteristic of a well formation at more than one lateral distance from a borehole. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
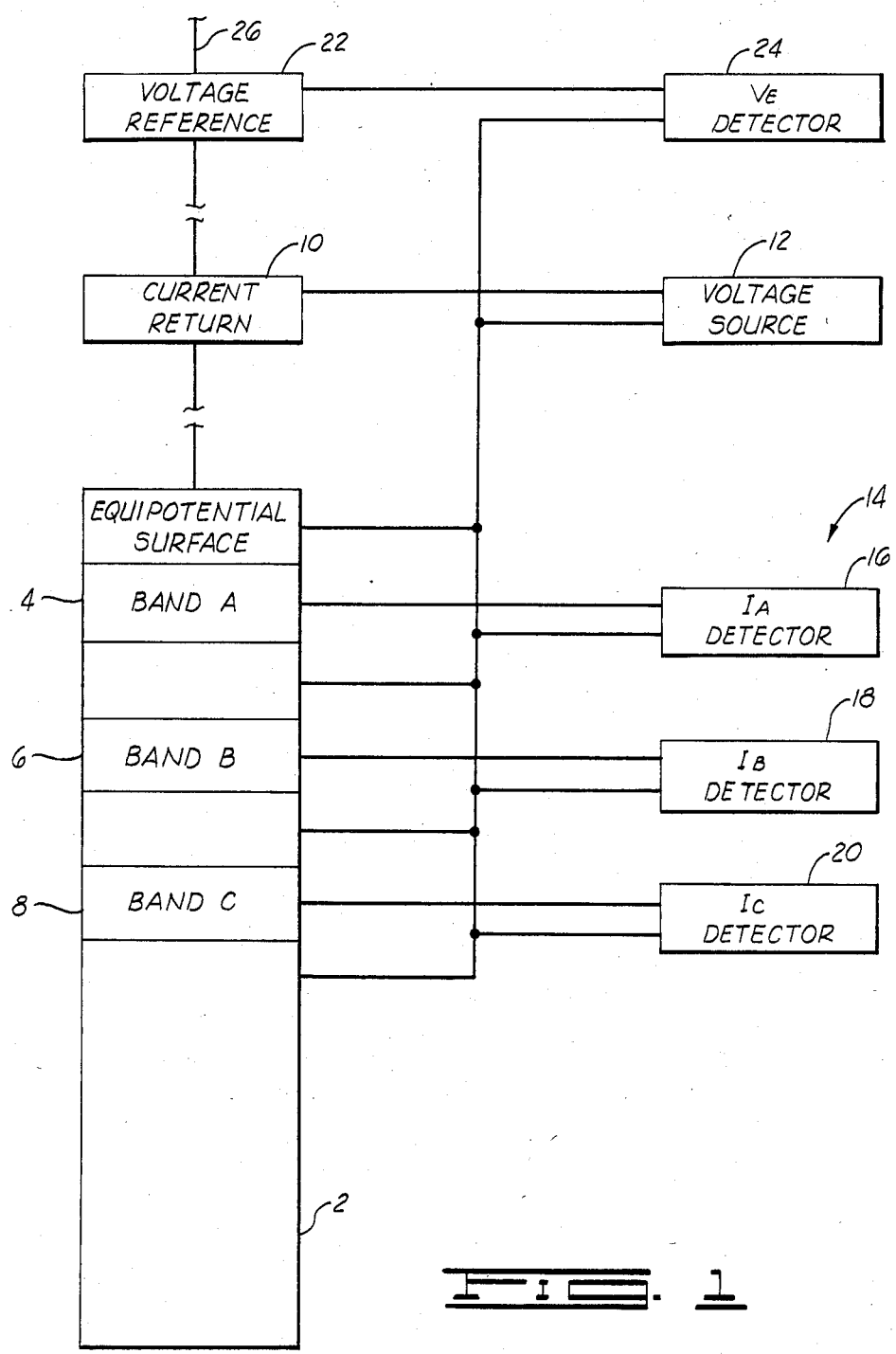
FIG. 1 is a block diagram of an apparatus of the preferred embodiment of the present invention.

The preferred embodiment of the present invention is broadly illustrated in the block diagram of FIG. 1. This preferred embodiment includes an elongated housing 2 having a substantially equipotential surface along which a plurality of electrically conductive members are disposed. Three electrically conductive members 4, 6, 8 designated as band A, band B, band C, respectively, are shown in the preferred embodiment of FIG. 1. This preferred embodiment further comprises current return means 10 for receiving currents flowing from the plurality of electrically conductive members spaced along the housing 2. To enable the currents to flow, the preferred embodiment also includes an enabling means specifically shown in FIG. 1 as a voltage source 12. To detect the magnitudes of the currents flowing from the conductive members disposed along the housing 2, the preferred embodiment also comprises current detector means 14 having individual detectors 16, 18, 20 associated with the conductive members 4, 6, 8, respectively. The preferred embodiment also includes voltage reference means 22 for providing a voltage reference relative to the housing 2, and the preferred embodiment comprises detector means 24 for detecting an electrical potential difference between the voltage reference means 22 and the housing 2. The voltage reference means 22, the current return means 10, and the housing 2 are retained along a cable 26 in a manner as known to the art. Although not shown, the cable 26 extends from a suitable winching system or the like disposed at the surface of a well borehole into which the aforementioned elements are disposed in a manner as known to those in the art. These elements will be more particularly described with reference to FIGS. 2-4.

Figure 2:
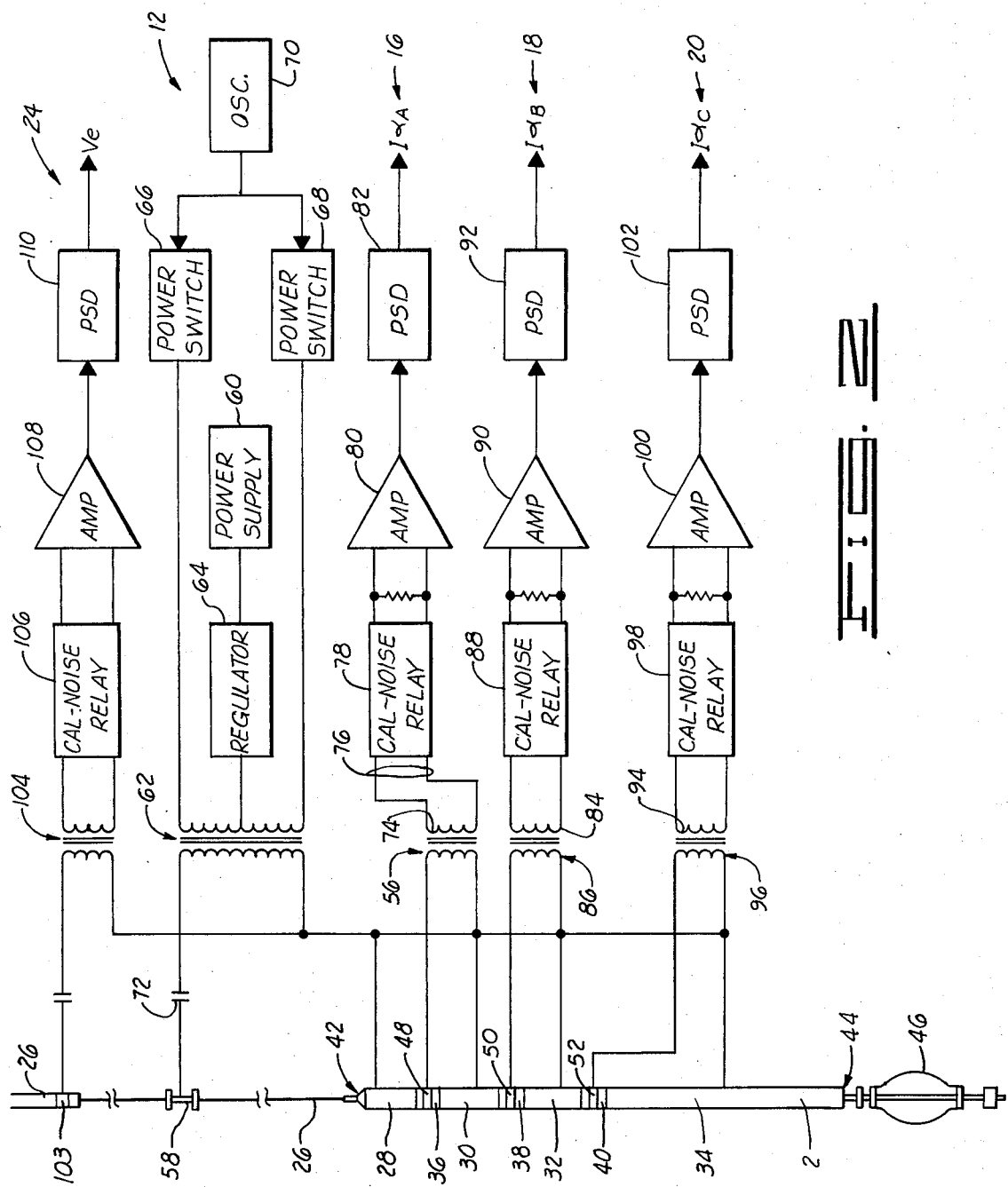
FIG. 2 is a schematic and functional block diagram of the preferred embodiment illustrated in FIG. 1.

The elongated housing 2 is schematically illustrated in FIG. 2. The housing 2 is constructed of elements which, individually, are known or readily ascertainable to those skilled in the art; however, these parts or elements are combined in accordance with the novel and non-obvious aspects of the present invention. The individual members of which the housing 2 is comprised in the illustrated preferred embodiment include four electrically conductive, hollow cylindrical members 28, 30, 32, 34. The preferred embodiment housing 2 also includes three electrically conductive, hollow hub members 36, 38, 40. As shown in FIG. 2, these elements are linearly connected to define the elongated housing 2. Specifically, the hub member 36 is connected between the cylindrical members 28, 30; the hub member 38 is connected between the cylindrical members 30, 32; and the hub member 40 is connected between the cylindrical members 32, 34. These connections are made as illustrated in FIG. 3.

Figure 3:
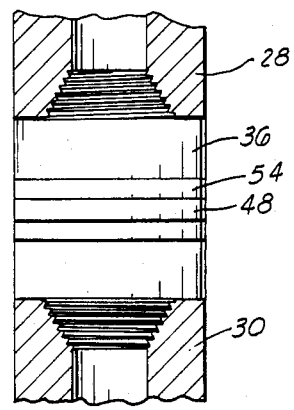
FIG. 3 is a partial sectional view of parts of two cylindrical members and a view of a hub member, with a mounted electrode, shown connected in electrical short-circuit relationship between the two members, which parts constitute a portion of the housing of the preferred embodiment shown in FIGS. 1 and 2.

FIG. 3 schematically shows a part of the cylindrical member 28 and a part of the cylindrical member 30 in section. Each of these portions has a threaded box end which receives a respective complementally threaded pin end of the hub member 36. The members 32, 34 are constructed similarly to the elements 28, 30, and the members 38, 40 are constructed similarly to the member 36. Each of the elements 28, 30, 36, as well as each of the remaining elements 32, 34, 38, 40, is made of a suitable electrically conductive material, such as nickel-clad stainless steel, so that when they are interconnected, all of these elements are in an electrical short-circuit relationship whereby there is electrical continuity from an upper end 42 to a lower end 44 of the housing 2. This construction is distinguishable from that of the apparatus described in U.S. Pat. No. 4,122,387 to Ajam et al. wherein the various guard sections, and thus their focused current electrodes, are electrically isolated or insulated from each other.

This construction of the housing 2 provides for a substantially equal potential to be maintained along the length of the housing 2. "Substantially" is used to include both an absolute equality of potential or voltage along the housing 2 and small variations therefrom which, in practice, will likely occur because of the inability to maintain a purely equal state in actuality. In the specifically illustrated preferred embodiment, the construction of the housing 2 provides an outer surface which may be referred to as an equipotential surface or a substantially equipotential surface to indicate that a substantially equal potential is maintained therealong.

FIG. 2 also shows that the upper end 42 of the housing 2, defined at one end of the cylindrical member 28 with the housing 2 disposed in a well borehole in the orientation illustrated in FIG. 2, has a suitable connecting mechanism of a type as known to the art for connecting with the cable 26. At the lower end 44, defined at the bottom of the cylindrical member 34 for the orientation depicted in FIG. 2, there is connected a suitable guiding or centralizing member 46 of a type as known to the art.

Mounted on each of the hub members 36, 38, 40 in the preferred embodiment is a respective one of the electrically conductive members 4, 6, 8. In the preferred embodiment, each of the electrically conductive members 4, 6, 8 includes a metallic band, referred to as an alpha band, and a connector means for electrically connecting the band to the respective hub. In FIG. 2, the conductive member 4 is shown to include an alpha band 48, and the conductive members 6, 8 are shown to include alpha bands 50, 52, respectively. The construction of these elements and their relationship to their respective hub members will be more particularly described with reference to FIG. 4.

Figure 4:
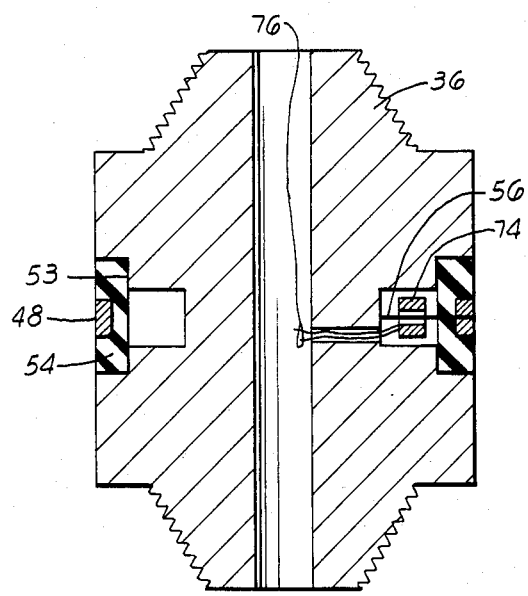
FIG. 4 is a sectional view of the hub and electrode shown in FIG. 3.

FIG. 4 depicts the hub member 36 in section. The hub member 36 has a circumferential groove 53 in which a band of insulating material 54 is disposed. Retained adjacent the outside surface of the insulation material 54, in a groove defined therein, is the alpha band 48. Extending radially inwardly from the band 48 is an electrically conductive pin 56 which electrically connects the band 48 to the hub member 36. The other hubs and bands are similarly connected. This construction shown in FIG. 4 is of a type as known to the art.

Each of the bands 48, 50, 52 and their associated connecting pins are parts of, and define, electrodes which provide focused current parts from which focused currents can leave the housing 2 for introduction into the surrounding formation. These electrodes are spaced along the continuous substantially equipotential surface of the housing 2. In the preferred embodiment, the electrode associated with the hub member 40 is located near the longitudinal center of the housing 2. The electrode associated with the hub member 38 is spaced from the hub member 40 between the hub member 40 and the upper end 42 of the housing 2. The electrode associated with the hub member 36 is spaced from the hub member 38 closer to the upper end 42. This disposition of the electrodes enables the present invention to simultaneously obtain information at different depths of investigation extending laterally or radially outwardly from the housing 2. The deepest depth of investigation is obtained with the electrode associated with the hub member 40 and the shallowest depth of investigation is conducted with the electrode associated with the hub member 36.

Due to the aforementioned construction wherein each of the electrodes associated with a hub member is disposed between sections of the continuous equipotential surface of the housing 2, a respective focused current flows from each electrode upon proper energization of the present invention. It is with each of these focused currents that the aforementioned depths of investigation are logged. After these currents leave the electrodes retained on the housing 2 and flow through the materials and the formations in which the housing 2 is disposed in the well borehole, the currents flow to the current return means 10. In the preferred embodiment, the current return means 10 comprises one, and only one, electrode 58 which is mounted on, but insulated from, the cable 26. In the preferred embodiment this single electrode is of the cable type as known to the art. The electrode 58 can be spaced along the cable 26 at a preselected distance from the upper end 42 of the housing 2. By placing the electrode 58 at different distances from the upper end 42, different depths of investigation can be obtained from each of the electrodes on the housing 2. That is, the depth of investigation for any one electrode can be reduced by decreasing the distance which separates the current return electrode 58 from the housing 2, and the depth of investigation can be increased by increasing the distance of this spacing. However, as known to the art, beyond a reasonably large distance, further increases in the distance will have little effect upon the depth of investigation.

It is to be noted that in the preferred embodiment of the present invention the single electrode 58 is continuously receiving currents which are being simultaneously or concurrently emitted from the various electrodes mounted on the housing 2. This is to be distinguished from single electrodes which receive only one current at a time from a plurality of multiplexed electrodes. That is, in the present invention there is no multiplexing so that if, for example, currents flow simultaneously from the bands 48, 50, 52 through the formation to the electrode 58, the electrode 58 receives all the currents simultaneously.

To provide a driving force to cause focused currents to flow from the bands 48, 50, 52 to the electrode 58, the preferred embodiment of the present invention includes the voltage source 12. The voltage source 12 of the preferred embodiment is shown in FIG. 2. In this preferred embodiment, the voltage source 12 includes one and only one power supply to provide one and only one voltage signal. This is distinguishable from the apparatus described in U.S. Pat. No. 4,122,387 to Ajam et al. wherein there is one power supply for each focusing current.

The preferred embodiment power supply of the present invention is made of components of types as known to the art. FIG. 2 shows that these components include a direct current power supply 60, such as a battery, connected to the center tap of the primary of a transformer 62 through a suitable voltage regulator 64. Two power switches 66, 68 are connected to respective ends of the primary of the transformer 62. The power switches 66, 68 are driven by an oscillator 70 so that a suitable alternating current signal is generated for driving the transformer 62 to provide an alternating current voltage signal in the secondary winding of the transformer 62. The magnitude of this voltage signal is selectable by appropriate selection of the power supply 60, regulator 64 and turns ratio of the transformer 62, for example. These components of the voltage source 12 are suitably mounted within the hollow interior of the housing 2 in a manner as known to the art.

The voltage signal from the secondary winding of the transformer 62 is applied between the equipotential housing 2 and the current return electrode 58 as illustrated in FIG. 2. A capacitor 72 is included to block any DC components in a manner as known to the art. When this voltage signal is of a suitable magnitude, the potential difference between the housing 2 and the electrode 58 enables focused currents to be generated. These currents flow from the respective electrodes associated with the hub members 36, 38, 40.

So that the focused currents emitted from the electrodes mounted on the housing 2 can be detected for constructing the electric logs which indicate the resistivity of the formation, the present invention includes the detector means 14. In the preferred embodiment, each of the individual detectors 16, 18, 20 of the detector means 14 is associated with a respective one of the electrodes mounted on the hubs 36, 38, 40. Each of these individual detectors is identically constructed in the preferred embodiment. These constructions are illustrated in FIG. 2.

The detector 16 is associated with the electrode mounted on the hub member 36. The electrode includes the band 48 and the pin 56. In FIG. 2, the pin 56 is schematically represented as a transformer primary (correspondingly labeled with the reference numeral 56) which is connected between the band 48 and the housing 2. This connection corresponds to the illustration of FIG. 4 wherein the pin 56 is connected between the band 48 and the hub member 36, which hub member 36 is at a substantially equal potential with the entire housing 2 as previously described.

Associated with the pin 56 is an effective transformer secondary winding 74. In the preferred embodiment, the winding 74 is provided by a toroidally shaped current detecting mechanism correspondingly labeled with the reference numeral 74 in FIG. 4. The mechanism 74 is of a type as known to the art for detecting current flow in a conductor passing through the mechanism. As shown in FIG. 4, the mechanism 74 has the pin 56 extending through the hollow center thereof in a manner as known to the art. In particular, as current flows through the pin 56 for transmission from the band 48, electrical windings of the toroidally shaped mechanism 74 have a current induced therein.

The current induced in the mechanism 74 travels along two conductors 76 which are connected to a calibrate-noise relay 78 of a type as known to the art. The output of the relay 78 is connected to an amplifier 80 of a type as known to the art. The amplifier 80 has an output which is connected to a phase sensitive detector 82 of a type as known to the art.

The elements 74, 76, 78, 80, 82 constitute the preferred embodiment of the detector 16. The elements 78, 80, 82 are mounted within an electronics package mounted in the housing 2 in a manner as known to the art. The connection between the mechanism 74 and the relay 78 is made via the conductors 76 which extend through hollow passageways defined in the hub member 36 and the cylindrical members comprising the housing 2. These hollow passageways are of types as known to the art and are illustrated in FIGS. 3 and 4.

Each of the individual current detectors 18, 20 is similarly constructed. As shown in FIG. 2, the current detector 18 has a current detecting mechanism 84 which is associated with a pin 86 included in the electrode mounted on the hub member 38 in a manner corresponding to the pin 56 used with the hub member 36. The current detector 18 also includes a calibrate-noise relay 88, an amplifier 90, and a phase sensitive detector 92.

The current detector 20 includes a current responsive mechanism 94 associated with a pin 96 which connects the band 52 to the hub member 40. The current detector 20 also includes a calibrate-noise relay 98, an amplifier 100, and a phase sensitive detector 102.

As shown in FIG. 2, the outputs from the phase sensitive detectors 82, 92, 102 provide signals representing measurements of the focused currents for the alpha band A, the alpha band B, and the alpha band C, respectively.

As in other focused current logging tools, there is the need for a voltage reference and voltage difference detecting means for measuring the potential (voltage) difference between the voltage reference locus and the locus where the focused currents are emitted so that resistivity calculations can be made as known to the art. These features are provided in the preferred embodiment of the present invention by the voltage reference means 22 and the voltage detector means 24.

In the preferred embodiment of the present invention, the voltage reference means 22 includes at least a portion of an electrically conductive covering mounted on the cable 26. This portion of the cable is disposed between the single current return electrode 58 and the mouth of the well borehole into which the cable 26 and the foregoing elements are disposed when the present invention is being used. The covering of the cable 26 is of a type as known to the art, such as an armor sheath. The portion of the armor sheath which is uninsulated can be selected at any suitable locus above the electrode 58; in the preferred embodiment illustrated in FIG. 2, this portion is shown at a locus 103.

To detect any potential difference between the voltage reference locus on the cable 26 and the housing 2, the present invention includes the detector means 24. The detector means 24 of the preferred embodiment is shown in FIG. 2 to include a suitable transformer means 104 having its primary winding capacitively coupled between the voltage reference locus on the cable 26 and the equipotential surface of the housing 2. The secondary winding of the transformer 104 is connected to a calibrate-noise relay 106 which is connected to an amplifier 108 which is, in turn, connected to a phase sensitive detector 110. The output of the phase sensitive detector 110 provides the voltage signal which can be used with the aforementioned detected currents from the current detectors to calculate resistivity of the formation in a manner as known to the art.

The preferred embodiment method of the present invention utilizes the foregoing apparatus. In performing this method, the housing 2 is attached to the cable 26, as is the single current return electrode 58. The cable 26 is moved by suitable means located at the surface as known to the art so that the housing 2 and the electrode 58 are lowered into the well borehole. The voltage reference locus 103 is also defined along the cable 26 and lowered into the hole along with the housing 2 and the electrode 58.

Once the elements have been lowered to the desired depth of the well borehole, the voltage source 12 is energized to apply the single voltage signal between the current return electrode 58 and the housing 2. In response to this single voltage signal, a plurality of focused currents are generated. These currents flow from the electrodes mounted along the housing 2. Specifically for the apparatus shown in FIG. 2, one focused current flows from the band 52, another focused current flows from the band 50, and still another focused current flows from the band 48. Each of these currents flows substantially laterally or radially outwardly from the housing 2 due to the focusing effect achieved by the adjacent equipotential sections provided by the cylindrical members 28, 30, 32, 34 of the housing 2. The focused current from the more centrally located band 52 achieves the greatest depth of investigation whereas the focused current for the band 48 achieves the shallowest depth of investigation.

The focused currents flow through the material surrounding the housing 2 and into the adjacent formation in accordance with the fields established by the equipotential surface of the housing 2 and the interactions of the focused currents upon each other. The flows of these currents eventually return to the electrode 58.

Each focused current is measured by the respective detector of the detector means 14 to generate the electrical logs indicative of the electrical characteristics of the formation or formations in which the logging is conducted. These measurements are conducted concurrently in response to the applied single voltage signal which causes the focused currents to be generated concurrently.

To provide a potential (voltage) difference signal, the preferred embodiment of the method uses the outer electrically conductive portion of the cable 26 as the voltage reference. The method detects any voltage difference between this electrically conducted portion and the continuous substantially equipotential surface of the housing 2.

From the foregoing it is apparent that the present invention exhibits a simplified construction in that the housing 2 is constructed of elements which provide electrical continuity along the entire length of the housing. Furthermore, the present invention utilizes only a single power supply regardless of the number of focused current electrodes that are used. Likewise, only a single current return is used regardless of the number of focused current electrodes used on the housing. Use of the cable as the voltage reference locus also makes for a simplified construction.

With the present invention a plurality of depths of investigation can be simultaneously or concurrently made. Although the preferred embodiment has been described with reference to three electrodes, the present invention contemplates that more or less than the exemplary three electrodes can be used. For example, to add an additional electrode, an additional cylindrical member and an additional hub member, with the electrode mounted thereon, could be threadedly inserted between the hub 40 and the cylindrical member 34 of the illustrated embodiment. Along with this added electrode, an additional detector circuit similar to any one of the circuits 16, 18, 20 would be added. However, no additional power supply or current return electrode would be needed.

The present invention also provides an apparatus and method for achieving improved focusing in high conductivity borehole fluids. The depth of investigation achieved with the present invention is also variable by simply adjusting the location of the bands on the housing or by adjusting the location of the current return electrode relative to the housing.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. A well logging apparatus for obtaining information for measuring electrical properties of a formation intersected by a well bore, comprising:
   cable means for moving a housing through the well bore;
   an elongated housing having a continuous substantially equal potential along its length, said housing including:
   a first electrically conductive cylindrical member having a first threaded end portion, and said first cylindrical member having a second end portion opposite said first threaded end portion and connected to said cable means;
   a first electrically conductive hub member having a second threaded end portion connected to said first threaded end portion so that said first hub member is connected in electrical short-circuit relationship with said first cylindrical member, and said first hub member having a third threaded end portion longitudinally opposite said second threaded end portion;
   a second electrically conductive cylindrical member having a fourth threaded end portion connected to said third threaded end portion so that said second cylindrical member is connected in electrical short-circuit relationship with said first hub member, and said second cylindrical member having a fifth threaded end portion longitudinally opposite said fourth threaded end portion;
   a second electrically conductive hub member having a sixth threaded end portion connected to said fifth threaded end portion so that said second hub member is connected in electrical short-circuit relationship with said second cylindrical member, and said second hub member having a seventh threaded end portion longitudinally opposite said sixth threaded end portion;
   a third electrically conductive cylindrical member having an eighth threaded end portion adapted to be connected to said seventh threaded end portion so that said third cylindrical member is adapted to be connected in electrical short-circuit relationship with said second hub member; and
   additional threadedly connected sets of one respective electrically conductive cylindrical member and one respective electrically conductive hub member, each of said sets having respective longitudinally opposite threaded end portions so that each of said sets is adapted for connection between said seventh and eighth threaded end portions in electrical short-circuit relationship therewith to selectably change the length of said housing but to maintain electrical short-circuit continuity throughout the length of said housing;
   a plurality of electrically conductive focused current members attached to said housing so that said members are longitudinally spaced from each other but are disposed all within the continuous substantially equal potential length of said housing, each of said members including respective means for providing a respective focused current path from which a focused current can leave said housing, said plurality of electrically conductive focused current members including:
   first electrode means, insulatedly mounted on said first hub member and electrically connected to said housing, for providing a first focused current path from which a first focused current can leave said housing;
   second electrode means, insulatedly mounted on said second hub member and electrically connected to said housing, for providing a second focused current path from which a second focused current can leave said housing; and
   additional electrode means, each of which is insulatedly mounted on the hub member of a respective one of said additional sets for electrically connecting to said housing, for providing selectable additional focused current paths from which additional focused currents can leave said housing from those of said additional sets selectably connected between said seventh and eighth threaded end portions;

current return means for receiving currents flowing from said plurality of electrically conductive focused current members, said current return means including a single electrode, regardless of the number of said additional sets connected between said seventh and eighth threaded end portions, spaced from said housing on said cable means and disposed within the well bore when said housing is disposed in the well bore;

means for enabling focused currents to flow simultaneously from said plurality of electrically conductive focused current members to generate simultaneously different, respective depths of investigation within the formation, said means for enabling including power supply means for applying a single voltage signal between said housing and said current return means regardless of the number of said additional sets connected between said seventh and eighth threaded end portions so that said first focused current and said second focused current and any and all said additional focused currents are generated in response to said single voltage signal; and current detector means for detecting the focused currents flowing through said plurality of electrically conductive focused current members.

* * * * *